United States Patent [19]

Hashimoto et al.

[11] Patent Number: 4,618,349
[45] Date of Patent: Oct. 21, 1986

[54] GRINDING WHEEL MANUFACTURING METHOD

[75] Inventors: Masahiro Hashimoto, Kamakura; Hideo Tani, Nara, both of Japan

[73] Assignees: Tokyo Shibaura Denki Kabushiki Kaisha, Kawasaki; Osaka Kongo Seito Co., Ltd., Osaka, both of Japan

[21] Appl. No.: 492,826

[22] Filed: May 9, 1983

[30] Foreign Application Priority Data

May 10, 1982 [JP] Japan .................................. 57-77733

[51] Int. Cl.⁴ .............................................. B24D 5/00
[52] U.S. Cl. ....................................... 51/298; 51/300; 51/307; 51/308; 51/309
[58] Field of Search ................. 51/298, 300, 307, 308, 51/309

[56] References Cited

U.S. PATENT DOCUMENTS 3,518,068 12/1967 Gillis .
3,528,788  9/1970 Seal ..................................... 51/298
3,645,706  2/1972 Bovenkerk ........................... 51/298
3,902,873  9/1975 Hughes ................................ 51/298

FOREIGN PATENT DOCUMENTS 57825 9/1967 German Democratic Rep. .
 500050 1/1971 Switzerland .
1154598 6/1969 United Kingdom .
1310686 3/1973 United Kingdom .

Primary Examiner—James Derrington
Attorney, Agent, or Firm—Cushman, Darby and Cushman

[57] ABSTRACT

A grinding wheel comprising abrasive grains each of which is coated with a conductive material and a non-conductive binder interposed among said abrasive grains. The amount of said conductive material ranges from 30 to 80% by weight based on said abrasive grains. The abrasive grains coated with said conductive material is contained in said grindstone in an amount ranging from 33 to 64% by volume. A method of producing said grinding wheel is also proposed. The method comprises preparing a mixture of said coated abrasive grains and said non-conductive binder, filling the mixture into a mold and molding said mixture by applying a pressure while maintaining said mixture at a constant temperature.

3 Claims, 10 Drawing Figures

GRINDING WHEEL MANUFACTURING METHOD

BACKGROUND OF THE INVENTION

The present invention relates to an improved grinding wheel and, more particularly, to an improved grinding wheel of the type suitable for heavy grinding and for processing of materials which are difficult to grind; and to a method of manufacturing such a grinding wheel.

A grinding wheel using a so-called sintered hard abrasive such as diamond, silicon nitride or boron nitride has an abrasive grain acting as a cutter which has high hardness, superior durability and abrasion resistance. Such a grinding wheel has been used for grinding and processing a variety of processed materials as well as for processing a variety of materials which are difficult to grind, such as sintered hard metals, stone materials, concrete, glass and ceramics. Grinding wheels of this type metal bond grinding wheels, resinoid bond grinding wheels, and vitrified bond grinding wheels are generally known as grinding wheels of this type. These are classified according to the material used as a binder for the abrasive grains. It is also known that performance of these grinding wheels varies greatly according to the kind and structure of the binder.

FIG. 1 illustrates the inner structure of a metal bond grinding wheel using a metal such as nickel as a binder, in which abrasive grains 1 are held by a binder 2. The binder 2 has a strong bonding ability for abrasive grains and is superior in durability and abrasion resistance, while it is poor in the sticking ability to processed materials and the cutting quality and insufficient in the formation of chip pockets resulting in easy stuffing. As a result, a grinding wheel having a relatively low abrasive grain density of about 75 is usually used, but this still has a poor grinding efficiency such that no sufficient effect on heavy grinding and the processing of materials hard for grinding has been presented. Compared with a metal bond grindstone, a resinoid bond grinding wheel using an organic polymer material as a binder is superior in the sticking ability to processed materials and the cutting quality, while being so poor in the ability of holding abrasive grains that the grains are prone to become removed. The grinding wheel of this kind is accordingly unsuitable for heavy grinding and the processing of materials difficult for grinding. This also applies to a vitrified bond grinding wheel. In order to solve the problems prevailing in conventional grindstones, an example as illustrated in FIG. 2 has been proposed, wherein an organic or inorganic binder 2 is formed in a porous form and metal particles 3 are impregnated in the pores so that the ability of holding abrasive grains is improved. Such a grinding wheel, however, has a basic structure such that the organic or inorganic binder 2 holds the abrasive grains 1 mainly so that its performance is not expected to be improved to a remarkable extent.

SUMMARY OF THE INVENTION

The present invention has for its object to provide a grinding wheel exhibiting excellent performance, for example, having a high grinding ratio and a small degree of wear by means of friction, and presenting a remarkable effect particularly on heavy grinding and the processing of materials which are difficult to grind, and to provide a method of manufacturing such a grinding wheel.

More specifically, the present invention has for its object to provide a grindstone comprising abrasive grains each of which is coated with a conductive material and a non-conductive binder interposed among said abrasive grains coated with said conductive material, said conductive material being in an amount ranging from 30 to 80% by weight with respect to said abrasive grains and said abrasive grains coated with said conductive material being contained in said grinding wheel in an amount ranging from 33 to 64% by volume.

Furthermore, the present invention has for its object to provide a method of manufacturing a grindstone characterized by the steps of coating abrasive grains with a conductive material in an amount ranging from 30 to 80% by weight with respect to the abrasive grains, homogeneously mixing the coated abrasive grains with 33 to 60% by volume based on the whole mixture of a non-conductive binder, and filling a resultant mixture of the coated abrasive grains and the non-conductive binder into a mold and molding it under pressure while maintaining constant a temperature applied by heating.

Characteristics of the grinding wheel according to the present invention reside in its structure, wherein the abrasive grains coated with the conductive material or member are dispersed within the non-conductive binder such that each of the abrasive grains is directly held by the conductive material or member as well being indirectly held through the conductive material or member by the non-conductive binder. The grinding wheel having such a structure in accordance with the present invention permits extremely efficient grinding and processing, as compared to conventional grinding wheels, because it can hold the abrasive grains securely even when its abrasive grain density is high and it can readily form chip pockets because of the presence of the non-conductive binder.

DESCRIPTION OF THE PREFERRED EMBODIMENTS DETAILED

Figure 1:
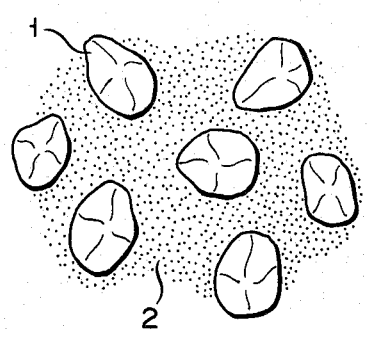
FIGS. 1 and 2 show enlarged views of the inner structure of a conventional metal bond grinding wheel and a resinoid bond grinding wheel, respectively.
Figure 2:
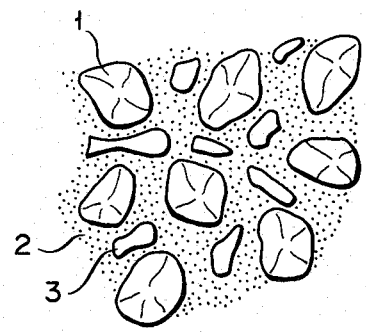
Figure 3A:
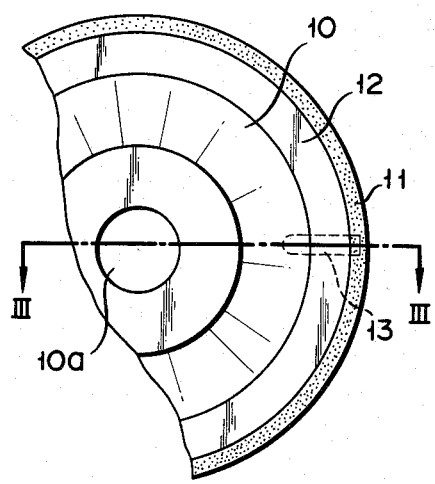
FIG. 3A is a partially cut-away plan view illustrating an applied example of the grinding wheel according to the present invention.
Figure 3B:
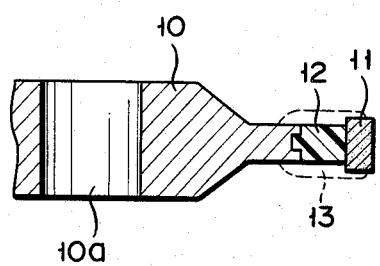
FIG. 3B is a cross-sectional view along the line III—III of FIG. 3A.

FIGS. 3A and 3B show an applied example of the grinding wheel according to the present invention wherein a metal base 10 in the form of a plate is provided which has an abrasive grain portion 11 at its outer periphery. The metal base 10 may be formed from a metal such as aluminum, and is provided at its middle portion with a through hole 10a for mounting the grinding wheel on a rotating shaft of a grinder or other grinding machine. The abrasive grain portion 11 is formed on a ring-shaped substrate portion 12 made of an organic polymer material such as a phenolic resin, which is in turn provided on the outer periphery of the metal base 10. If it is required that the abrasive grain portion 11 be conductive and be connected electrically to the metal base 10, a connecting conducting paint layer 13 may be formed extending across the ring-shaped substrate portion 12 by painting the conducting paint on portions indicated by the dashed lines in the drawings.

Figure 4:
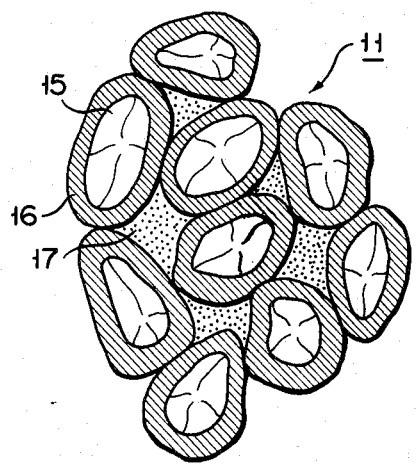
FIG. 4 is an enlarged view illustrating the inner structure of the grinding wheel according to the present invention.

FIG. 4 is an enlarged view illustrating the abrasive grain portion 11 of FIGS. 3A and 3B. Abrasive grains 15 which act as a cutter for grinding may comprise grains of a sintered hard abrasive such as artificial or natural diamond, and silicon nitride or cubic boron nitride, having an arbitrarily chosen grain size distribution. FIG. 4 illustrates a specific example of diamond abrasive grains. Each of the abrasive grains 15 constituting the abrasive grain portion 11 is thoroughly coated with a conductive coating 16. The conductive coating 16 coating each of the abrasive grains 15 is partially secured to the conductive coating 16 of neighboring abrasive grains 15 so as to form a structure wherein a non-conductive binder 17 is interposed between conductive coatings 16 which are partially bonded to each other. The binder 17 is filled tightly therebetween with few or no pores being formed in the structure. Even if such pores are formed in a portion in which the binder is filled, their size and amount are negligible. It is thus noted that the abrasive grains 15 are held directly by the conductive coatings 16 integrally formed therearound, and indirectly by the non-conductive binder 17 interposed tightly between the coated grains. This structure allows the abrasive grains 15 to be held securely in relation to each other and provides a high performance grinding wheel in which the abrasive grains 15 may be securely held at a high density.

The conductive coatings 16 used for coating the abrasive grains 15 in accordance with the present invention may comprise a material which has a favorable bonding property with the abrasive grains 15 and sufficient strength to prevent undesirable separation of the abrasive grains 15 upon grinding and processing, and which is readily subject to plastic deformation during a hot press molding step in manufacturing a grinding wheel, as will be described hereinafter, and may include a metal such as, for example, Cu, Ag, Au, Sn, Zn, Al, Ni, and Cr, and an alloy thereof. The conductive coatings 16 may be formed on the abrasive grains 15 as uniform one-layer structures by means of a known method such as plating or vacuum deposition of one of the group of metals or alloys as described above. In order to further enhance the function of the conductive coatings 16, each coating 16 may comprise a multi-layer structure having two or more layers either of an identical metal or alloy or of different metals or alloys. Such a multi-layer structure is preferably formed such that the inner-most layer in direct contact with the abrasive grain 15 is composed of a relatively soft metal capable of being readily plastic-deformed and easily bonded, and the outer layer of the multi-layer structure comprises a relatively hard metal. In the case where a multi-layer structure of the conductive coating 16 is formed with layers of the same metal, one layer may be formed by means of electrolytic nickel plating while the other layer is formed by means of electrolytic nickel plating. In the case where a multi-layer structure is formed with layers of different metals, one layer may formed by means of copper plating and another layer by means of nickel plating on top of the copper-plated layer.

The non-conductive binder 17 to be used in accordance with the present invention should be one having a good binding property with the conductive coatings 16 and may include, for example,..a synthetic polymer material such as a phenolic resin, an epoxy resin, a polyamide, an unsaturated polyester, a polyimide, a polyacetal or a polyacryl compound; a naturally-occurring organic polymer material such as shellac; or an inorganic binder such as a glass material. Furthermore, the non-conductive binder 17 may be an abrasion-resistant, inorganic powder, such as talc, silicon carbide, alumina, chromium oxide, iron oxide or molybdenum disulfide in order to further enhance the binding property and to ensure that chip pockets which are readily formed during grinding may be readily refilled during the dressing process.

The following is a description of a method of manufacturing such a grinding wheel according to the present invention.

The metal base 10 is first formed in a predetermined shape for grinding and processing, and the substrate portion 12 is formed of an organic polymer material on the outer periphery of the metal base 10. The substrate portion 12 may be formed by molding using a combination of a mold with the metal base 10. The metal base 10 provided with the substrate portion 12 is then mounted in a hot press mold so as to provide a ring-shaped gap of a given size along the outer periphery of the substrate portion 12, so as to allow the formation of the abrasive grain portion 11 on the outer periphery of the substrate portion 12.

The coated abrasive grains to be used for forming the abrasive grain portion 11 may be prepared by coating, a given metal or alloy selected from the group of metals and alloys described hereinabove onto abrasive grains 15 having a predetermined grain size distribution, by means of plating, vacuum deposition or any other conventional technique. The resulting metal-coated abrasive grains 15 are then mixed homogeneously with a desired binder in a given proportion, and the resulting mixture is filled in the ring-shaped gap formed between the hot press mold and the substrate portion 12 assembled therein. The abrasive grain portion 11 is then formed by subjecting the metal-coated abrasive grains placed in the mold to hot press molding by heating them, together with the metal base 10 and the hot press mold, at a constant temperature. Conditions for heating and applying pressure during the hot press molding process may vary according to the metal used to coat the abrasive grains, the type of binder used, an amount of coating metal, a mixing ratio of the coated abrasive grains 15, or other factors. It is necessary that a temperature range to be maintained particularly while pressure is applied be within a range capable of generating gases contained in the binder by causing softening of or a decrease in a viscosity of the binder. The application of pressure not only controls the expansion of the binder by gases contained therein but also causes plastic deformation of the metal coatings 16 on the abrasive grains 15, thereby enhancing the bonding of the metal coatings with each other. Pressure to be applied while maintaining a constant temperature may be applied discontinuously a number of times, and this method of application serves to further promote the release of the gases contained in the binder and the plastic deformation of the metal coatings 16 on the abrasive grains 15. Thus, the conditions for heating and applying pressure during the hot press molding are extremely significant factors in providing a grindstone with a high abrasive grain density. This method of hot press molding causes either no pores or very few, if any, pores to be formed in the binder, and permits the metal coatings 16 on the abrasive grains 15 to be securely bonded with each other, thereby providing an abrasive grain portion 11 wherein the abrasive grains 15 are tightly packed to a high density. In order to securely bond the abrasive grain portion 11 to the substrate portion 12, an adhesive may be arbitrarily coated in advance on the outer periphery of the substrate portion 12.

A more detailed description of the formation of the abrasive grain portion 11 by means of hot press molding will now be given. Diamond abrasive grains are coated with Ni in the amount of 70% by weight, and 53% by volume of the coated abrasive grains is mixed with 47% by volume of a phenolic resin as a binder to give a homogeneous mixture. This mixture is filled into a ring-shaped gap formed between the metal base 10 having the substrate portion 12 formed thereon and an inner surface of a hot press mold. Hot press molding is carried out by applying pressures ranging from 150 to 350 kg/cm² to the homogeneous mixture placed in the mold, together with the metal base 10 and the hot press mold, while maintaining the temperature in a range from 175° to 260° C.

The abrasive grain portion 11 formed by means of hot press molding as described above is then subjected either to forced or natural cooling while maintaining the applied pressure, and is thereafter discharged integrally with the metal base 10 from the hot press mold. The metal base 10 and the substrate portion 12 are then subjected to finishing processes and the abrasive grain portion 11 to size modification and dressing.

Alternatively, a mold with a pair of hot presses assembled together is used for the formation of the ring-shaped abrasive grain portion 11 which in turn is allowed to adhere with an adhesive to the base 10 with the substrate portion 12 formed thereon.

By whichever method the abrasive grain portion 11 is formed, it is necessary to provide the abrasive grain portion 11 by mixing the abrasive grains 15 coated with a metal or metals with the non-conductive binder 17 in order to obtain a structure such that, as shown in FIG. 4, each of the abrasive grains 15 is enclosed within a conductive coating 16 and the conductive coatings on respective abrasive grains 15 are tightly bonded to each other.

Whether the abrasive grain portion 11 is properly formed to have the desired structure as shown in FIG. 4 may be determined by microscopic observation of a cross section of the abrasive grain portion 11. More simply, it may be determined whether the conductive coatings 16 coating the abrasive grains 15 are properly connected to each other without destroying the abrasive grain portion 11 by measurement of conductivity. Measurement of the conductivity may be carried out by applying a voltage as low as about 10 volts at the two ends of an arbitrarily chosen diameter of the ring-shaped abrasive grain portion 11, or at each of the ends of two diameters intersecting each other at an angle of 90° or by repeatedly measuring the conductivity at two points on a diameter which are a constant distance apart.

Figure 5:
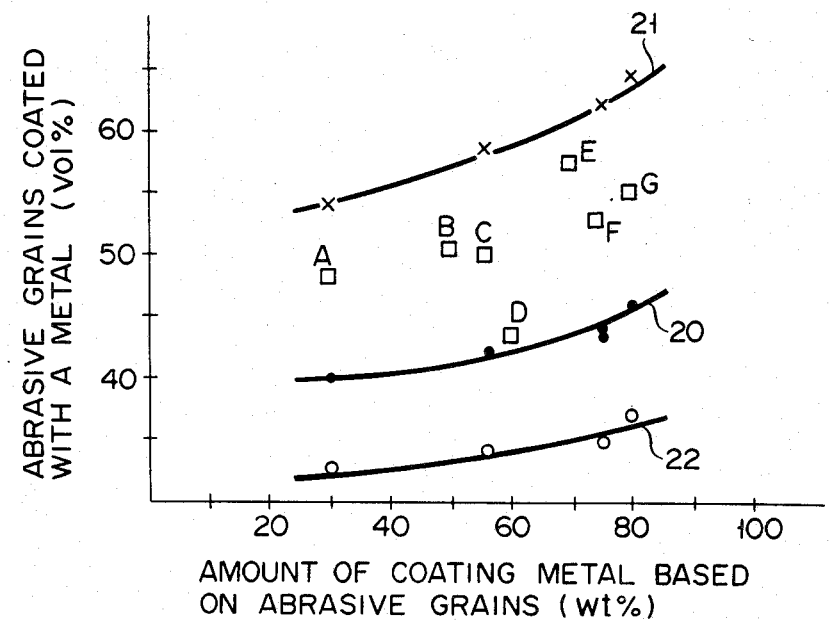
FIG. 5 is a graph illustrating a relationship between the amount of coating metal per abrasive grain and the density of metal-coated abrasive grains within the binder.

FIG. 5 illustrates, for a conventional grinding wheel, a relation between an amount of coating metal (nickel) coated on diamond abrasive grains and an amount of the metal-coated abrasive grains dispersed within a non-conductive binder. As shown in FIG. 5, a region above a curve 20 indicating a coating metal amount on the metal-coated abrasive grains of 40% by volume or higher with respect to the binder is one where continuous conductivity may be recognized throughout the abrasive grain portion 11 as a result of the conductivity measurement. A region [I] between the curves 20 and 21 is one where a structure is particularly capable of being formed in a desired manner such that the abrasive grains 15 may be packed at a high density with each of the abrasive grains 15 above tightly secured. It is noted, however, that a region above the curve 21 provides a structure resembling that of conventional metal bond grinding wheels. On the other hand, in a region [II] between the curves 20 and 22, a loss of continuity may be recognized at least at part of the abrasive grain portion 11, and a density of the abrasive grains 15 is relatively low as compared to that indicated in the region [I] while a microscopic observation shows a structure nearly the same as that observed in the region [I]. From the conductivity measurements and microscopic observation, it is noted that a desired structure of the abrasive grain portion 11 is obtained when the amount of metal coating the abrasive grains 15 is in the range from 30 to 80% by weight with respect to the abrasive grains and where the amount of metal-coated abrasive grains is in the range between the curve 22 indicating the amount of 33 to 37% by volume thereof with respect to the binder 17 and the curve 21 indicating the amount of 54 to 64% by volume thereof with respect thereto.

Table 1 below shows several examples of the abrasive grain portion 11 prepared by coating diamond abrasive grains having a size distribution of #100/#120 grit with various metals or alloys and then mixing the metal-coated abrasive grains with a phenolic resin in a given proportion. Ag and Cu are used as coating metals in addition to Ni. A grinding wheel (B) is an example using coatings having a two-layer structure where the first layer is formed by means of electrolytic nickel plating and the second layer is formed thereon by means of electrolytic nickel plating. It is to be noted that the grinding wheels (A) to (B) each show continuity as a result of conductivity measurements. The same symbols are used as in FIG. 5 in order to easily identify the location of these grinding wheels therein.

Figure 6:
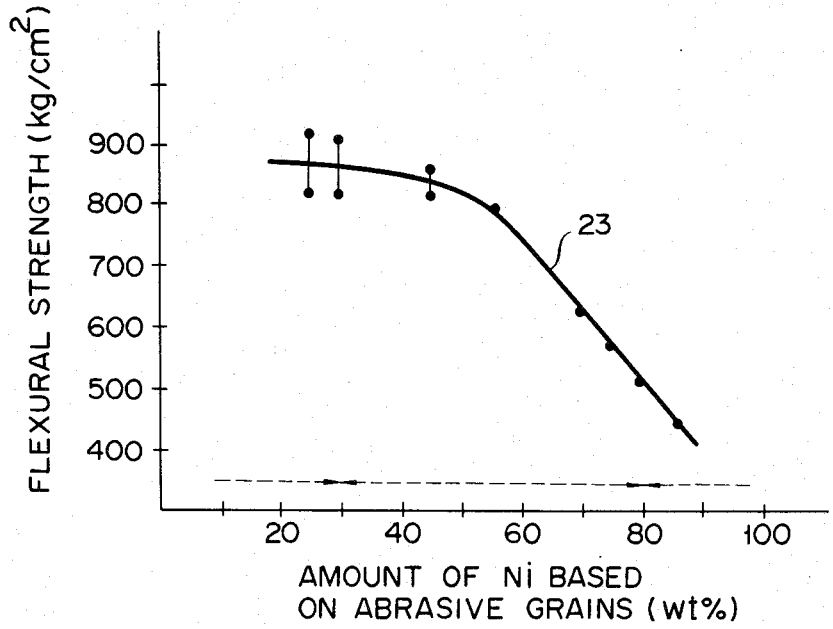
FIG. 6 is a graph illustrating a relationship between the amount of coating nickel per abrasive grain with flexural strength.
Figure 7:
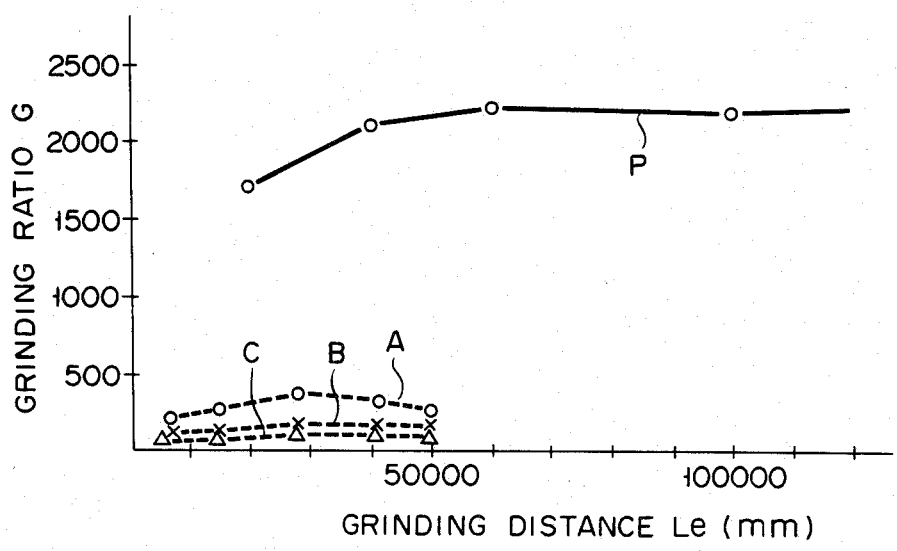
FIG. 7 is a graph illustrating a relationship between a grinding distance and a grinding ratio for different grinding wheels.
Figure 8:
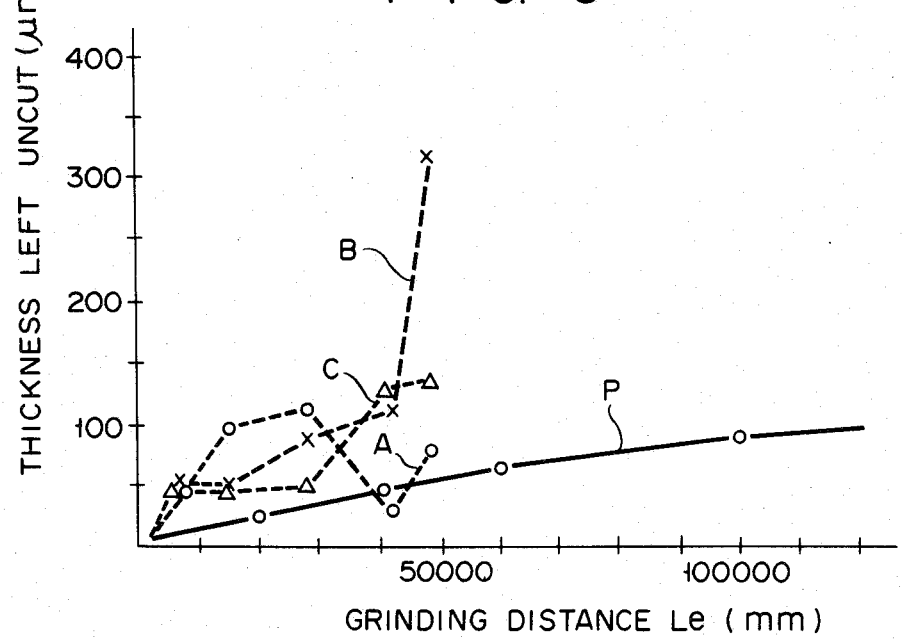
FIG. 8 is a graph illustrating a relationship between a grinding distance and a residual thickness left uncut.
Figure 9:
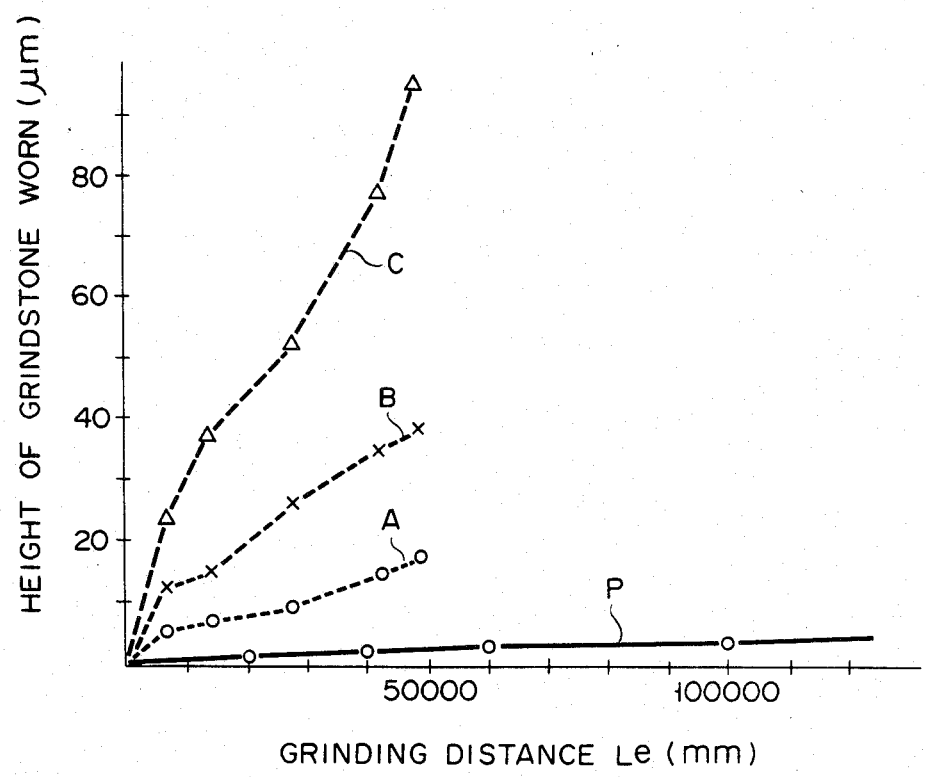
FIG. 9 is a graph illustrating a relationship between a grinding distance and a height of grinding wheel wear.

Performance of the grinding wheels according to the present invention will now be described in more detail. Table 2 below shows the flexural strength and continuity of various grinding wheels prepared by mixing nickel-coated diamond abrasive grains having a size distribution of #100/#120 grit with a varying amount of a phenolic resin. For comparison purposes, the flexural strength is also given for resinoid bond grinding wheels which were prepared by mixing White Arandom (WA) having a size distribution of #100/#120 grit, having no metal coating, with varying amounts of a phenolic resin. In FIG. 6, a curve 23 represents a relation of flexural strength with an amount of coated Ni based on the results given in Table 2. From the results of this table and FIG. 6, it is found that the abrasive grain portions formed by using Ni-coated diamond abrasive grains have a flexural strength not much different from that of the White Arandom grinding wheel having a size distribution of #100 grit, and slightly lower than that of the White Arandom grinding wheel having a size distribution of #120 grit, although the flexural strength of the abrasive grain portion formed from the Ni-coated diamond abrasive grains shows a tendency to decrease with an increase in the amount of the metal coating the abrasive grain. It is accordingly to be noted that the grinding wheel according to the present invention has a flexural strength as high as that of conventional resinoid bond grinding wheels.

resinoid bond grinding wheels using diamond abrasive grains. Table 3 below shows compositions of commercially available grinding wheels used for comparative testing. In FIGS. 7 to 9, a curve "P" indicates the characteristics of this invention; and curves "A", "B" and "C", those of the conventional grinding wheels A, B and C shown in Table 3 respectively. The grinding was carried out on an inorganic material which is difficult to grind known as a heat-resistant, abrasion-resistant member. As shown in FIG. 7, the developed grinding wheel in accordance with the present invention has a grinding ratio (determined by a ratio of the amount of a processed material ground to the amount of grinding wheel wear), which is an important item in determining grinding performance, about ten times higher than that of a commercially available grinding wheel generally recognized as having the highest performance. Accordingly, the grinding wheel according to the present invention

TABLE 1

|  | Grinding wheel | | | | | | |
| --- | --- | --- | --- | --- | --- | --- | --- |
|  | a | b | c | d | e | f | g |
| Abrasive grain (p) | Diamond | Diamond | Diamond | Diamond | Diamond | Diamond | Diamond |
| Coating metal (m) | Ni | Ni + Ni | Ni | Ag | Ni | Cu | Ni |
| Binder (b) | Phenolic resin | Phenolic resin | Phenolic resin | Phenolic resin | Phenolic resin | Phenolic resin | Phenolic resin |
| m/p (wt %) | 30 | 45 | 56 | 60 | 70 | 74 | 80 |
| $\frac{(p+m)}{(p+m)+b}$ (vol %) | 48 | 50 | 50 | 42 | 57 | 53 | 55 |

TABLE 2

| Abrasive grains | Diamond #100/120 (grit) | | | | | | | | |
| --- | --- | --- | --- | --- | --- | --- | --- | --- | --- |
| Amount of coating Ni per abrasive grain (wt %) | 0 | 25 | 30 | 45 | 56 | 70 | 74 | 80 | 86 |
| Amount of Ni—coated abrasive grains (vol %) | 56 | 47.5~51 | 46~50 | 44.5~51.5 | 42~53 | 48~54.5 | 48.5~55 | 49.5~55.5 | 51~56 |
| Conductivity | Not conductive | Not conductive | Continuity recognized | Continuity recognized | Continuity recognized | Continuity recognized | Continuity recognized | Continuity recognized | — |
| Flexural strength (kg/cm²) | — | 815~910 | 815~905 | 815~860 | 800 | 630 | 575 | 520 | 450 |

| | Abrasive grains | White Arandom #100 (grit) | | | White Arandom #120 (grit) | | |
| --- | --- | --- | --- | --- | --- | --- | --- |
| | Amount of coating Ni per abrasive grain (wt %) | 0 | 0 | 0 | 0 | 0 | 0 |
| | Amount of Ni—coated abrasive grains (vol %) | 45 | 50 | 53.5 | 40 | 45 | 50 |
| | Conductivity | Not conductive | Not conductive | Not conductive | Not conductive | Not conductive | Not conductive |
| | Flexural strength (kg/cm²) | 768 | 938 | 993 | 1190 | 1400 | 1510 |

FIGS. 7 to 9 show grinding performance of the grinding wheel having an abrasive grain portion (in the drawing and hereinafter, referred to as "developed grinding wheel") prepared by coating diamond abrasive grains having a size distribution of #100 to #120 grit with 56% by weight of Ni, and then mixing the Ni-coated abrasive grains with a mixture of a phenolic resin in the amount of 50% by volume, on an abrasion-resistant member, as compared to commercially available has an extremely superior grinding performance. As shown in FIG. 8, an amount or thickness left uncut (determined by a difference between a desired amount of cutting and an actual amount of cutting) is superior and constant as compared to commercially available grinding wheels A, B and C, thereby permitting high precision grinding.

TABLE 3

| Items | Grinding wheel A | Grinding wheel B | Grinding wheel C |
|---|---|---|---|
| Abrasive grains/Size distribution | Diamond 100/120 | Diamond 100/120 | Diamond 100/120 |
| Binder | Resin | Resin | Resin |
| Amounts of abrasive grains per binder (concentration) | 75 | 75 | — |

TABLE 4

| Items | Grinding wheel A | Grinding wheel B | Grinding wheel C | Grinding wheel (this invention) |
|---|---|---|---|---|
| Grinding ratio | 245 | 115 | 52 | 2411 |
| Grindability (actual amount of grinding/determined amount) | 99.6 | 98.6 | 99.4 | 99.8 |
| Height of grinding wheel wear ($\mu$m) | 15 | 35 | 77 | 2 |
| Grinding efficiency Z' mm$^3$/mmS | 2.5 | — | — | 10 |
| Roughness on processed surface R$_{max}$ ($\mu$m) | 9 | 6 | 6.5 | 4.5 |

FIG. 9 indicates that the grinding wheel according to the present invention is superior regarding the amount of grinding wheel wear to any commercially available grinding wheels A, B and C tested for comparative purposes, whereby wear caused during grinding of a material which is difficult to grind occurs to a lesser extent. Table 4 above represents a comparion of grinding performance of the grinding wheel according to the present invention over the same grinding distance L$_c$ (length of a processed material × number of cutting) with that of commercially available grindstones. This table indicates grindability determined by a ratio of an actual amount of grinding to a desired amount of grinding instead of a thickness of a processed material left uncut, a grinding efficiency (Z'), and the roughness of a surface indicating a processed surface condition after grinding, in addition to the grinding ratio and a depth of grinding wheel wear. Tests for the grinding efficiency (Z') were carried out by means of a wet grinding technique using a plate grinder and determining an amount of depth of cut at 60 $\mu$m/pass (10 $\mu$m/pass for a conventional grinding wheel) while rotating the grinding wheel at a velocity of 1,800 m/min and the table traverse velocity (equal to a processed material-traverse velocity) of 15 m/min. As has been mentioned hereinabove, the grinding wheel according to the present invention is superior in terms of grinding ratio, grindability, and the grinding wheel wear to the commercially available grinding wheels used for comparative testing. From this table, it is also found that the grinding efficiency and the processed surface condition after grinding are superior to those obtained using the commercially available grinding wheels.

As has been mentioned hereinabove, it is found that, although the grinding wheel according to the present invention has a mechanical strength or flexural strength as high as the conventional resinoid bond grinding wheels, it is remarkably superior in terms of grinding ratio, grindability (or an amount or thickness left uncut), and an amount of a grinding wheel wear. It is accordingly noted that the grinding wheel according to the present invention has a structure such that the metal coatings on each of the abrasive grains 15 are tightly secured to each other and the abrasive grains 15 are held securely by the conductive coatings 16 integral thereto, whereby separation of the abrasive grains 15 is rendered difficult. Thus, the grinding wheel according to the present invention has a high ability to hold the abrasive grains so that it can readily provide a highly efficient grinding wheel having a high abrasive grain density. Furthermore, since an amount left uncut is rendered small and stable in spite of the difficulty of causing the abrasive grains 15 to become separated, it is seen that the binder present in interposition with the conductive coatings 16 can form chip pockets in an appropriate quantity. This indicates that blocking is caused to a lesser extent. In accordance with the present invention, such a grinding wheel having conductivity also has the advantage that it can be utilized for electrolytic grinding as well as for the processing of a material which is difficult to grind.

The grinding wheel according to the present invention can be utilized for a rotary grinder and for any other grinding or lapping device.

What we claim is:

1. A method of manufacturing a grindstone which comprises the steps of:
   (a) coating each of a plurality of abrasive grains with a conductive material in an amount ranging in total from 30 to 80% by weight based on said abrasive grains,
   (b) homogeneously mixing the resultant coated abrasive grains with a non-conductive binder so as to contain said coated abrasive grains with a non-conductive binder so as to contain said coated abrasive grains in an amount ranging from 40 to 64% by volume and sufficient to effect electrical conductivity throughout the grindstone,
   (c) filling the mixture of said coated abrasive grains with said non-conductive binder into a mold,
   (d) molding said mixture by discontinuously applying a pressure a plurality of times while maintaining the temperature of said mixture by heating said mixture in a range in which said binder is softened so as to discharge gasses therein.

2. A method of manufacturing a grindstone according to claim 1, wherein the pressure ranges from 150 to 350 kg/cm$^2$.

3. A method of manufacturing a grindstone according to claim 1 wherein the temperature of said mixture is within the range from 175° C. to 260° C.

* * * * *